United States Patent
Breay et al.

(10) Patent No.: US 6,883,836 B2
(45) Date of Patent: Apr. 26, 2005

(54) POSITIVE LOCKING FITTING ASSEMBLY

(75) Inventors: Clifton P. Breay, Indian Hills, CO (US); Thomas B. Darby, Renton, WA (US); Daniel E. Keenan, Littleton, CO (US); Anthony W. Vaughan, Arvada, CO (US)

(73) Assignee: Stanley Aviation Corporation, Aurora, CO (US)

( * ) Notice: Subject to any disclaimer, the term of this patent is extended or adjusted under 35 U.S.C. 154(b) by 51 days.

(21) Appl. No.: 10/347,096

(22) Filed: Jan. 17, 2003

(65) Prior Publication Data
US 2004/0140667 A1 Jul. 22, 2004

(51) Int. Cl.$^7$ ................................................ F16L 27/00
(52) U.S. Cl. ...................... 285/189; 285/66; 285/145.4; 285/223; 285/206
(58) Field of Search ............................... 285/19, 31, 66, 285/121.4, 128.1, 139.1, 145.4, 223, 298, 302, 371, 398, 233, 234, 189, 206, 207, 208, 20, 56, 388, 387, 386

(56) References Cited

U.S. PATENT DOCUMENTS

| | | |
|---|---|---|
| 477,819 A | 6/1892 | Pforr |
| 756,246 A | 4/1904 | Lee |
| 804,590 A | 11/1905 | Ervin et al. |
| 891,783 A | 6/1908 | Parkinson |
| 1,131,961 A * | 3/1915 | Rogers ........................ 285/31 |
| 2,112,352 A | 3/1938 | Vetrano |
| 2,344,698 A | 3/1944 | Howe |
| 2,511,495 A | 6/1950 | Crot |
| 2,890,434 A | 6/1959 | Ray et al. |
| 3,154,328 A | 10/1964 | Masse |
| 3,167,835 A | 2/1965 | Bengtsson |
| 3,181,189 A | 5/1965 | Leyden |
| 3,201,149 A | 8/1965 | Bragg |
| 3,334,926 A | 8/1967 | Faccou |
| 3,361,450 A | 1/1968 | Franck |

(Continued)

FOREIGN PATENT DOCUMENTS

| | | |
|---|---|---|
| CA | 2321508 | 11/1999 |
| DE | 28 34 223 | 2/1980 |
| EP | 0 099 293 | 1/1984 |
| EP | 0 412 677 | 2/1991 |
| EP | 0 447 453 | 9/1991 |
| EP | 0 535 867 | 4/1993 |
| EP | 0 853 740 | 7/1998 |
| EP | 0 934 484 | 8/1999 |
| EP | 1 092 905 | 4/2003 |
| FR | 692.067 | 10/1930 |
| FR | 1.221.842 | 6/1960 |
| GB | 1046601 | 10/1966 |
| GB | 1156882 | 7/1969 |
| GB | 2066399 | 7/1981 |
| GB | 2167508 | 5/1986 |

(Continued)

Primary Examiner—Aaron Dunwoody
(74) Attorney, Agent, or Firm—Sheridan Ross PC

(57) ABSTRACT

A positive locking fitting assembly is provided for interconnecting two adjacent structures, such as two modular components of an aircraft. The fitting assembly includes a pair of couplers which attach to the respective modular components, and a transfer tube which interconnects the couplers. Each coupler has a positive locking feature which prevents inadvertent uncoupling during operation. A plurality of redundant seals are incorporated throughout the construction of the fitting assembly which ensures a leak proof relationship not only between the joined pair of modular components, but also through the structure of the elements of the fitting assembly itself.

31 Claims, 11 Drawing Sheets

U.S. PATENT DOCUMENTS

| | | |
|---|---|---|
| 3,430,306 A | 3/1969 | Tareau |
| 3,605,210 A | 9/1971 | Lohr |
| 3,625,552 A | 12/1971 | Mahoff et al. |
| 3,669,472 A | 6/1972 | Nadsady |
| 3,709,526 A | 1/1973 | Cromie |
| 3,749,424 A * | 7/1973 | Greene .................... 285/139.1 |
| 3,753,205 A | 8/1973 | Tuger |
| 3,776,579 A | 12/1973 | Gale |
| 3,891,246 A | 6/1975 | Hopper |
| 3,891,290 A | 6/1975 | Marshall |
| 3,891,291 A | 6/1975 | Nadsady et al. |
| 3,999,825 A | 12/1976 | Cannon |
| 4,008,937 A | 2/1977 | Filippi |
| 4,150,464 A | 4/1979 | Tracy |
| 4,249,786 A | 2/1981 | Mahoff |
| 4,285,564 A | 8/1981 | Spinner |
| 4,318,548 A | 3/1982 | Oberle et al. |
| 4,332,404 A * | 6/1982 | Huffman .................... 285/223 |
| 4,346,428 A | 8/1982 | Gale |
| 4,353,580 A | 10/1982 | Houck |
| 4,395,049 A | 7/1983 | Schertler |
| 4,408,375 A | 10/1983 | Skobel |
| 4,427,218 A | 1/1984 | Duvet et al. |
| 4,438,959 A | 3/1984 | Valentine |
| 4,478,439 A | 10/1984 | Arnold |
| 4,487,462 A | 12/1984 | Gale et al. |
| 4,522,433 A | 6/1985 | Valentine et al. |
| 4,534,090 A | 8/1985 | Skobel |
| 4,559,679 A | 12/1985 | Downey |
| 4,569,106 A | 2/1986 | Lovato |
| 4,577,377 A | 3/1986 | Kasai |
| 4,600,220 A | 7/1986 | Agnelli |
| 4,618,170 A | 10/1986 | Fishburne |
| 4,621,393 A | 11/1986 | Ambal |
| 4,621,840 A | 11/1986 | Foster |
| 4,631,787 A | 12/1986 | Kasai |
| 4,639,982 A | 2/1987 | Kasai |
| 4,655,482 A | 4/1987 | Myers et al. |
| 4,658,326 A | 4/1987 | Clark et al. |
| 4,662,040 A | 5/1987 | Terrell et al. |
| 4,672,725 A | 6/1987 | Kasai |
| 4,688,337 A | 8/1987 | Dillner et al. |
| 4,696,494 A | 9/1987 | Schmitz et al. |
| 4,699,403 A | 10/1987 | Wong |
| 4,712,280 A | 12/1987 | Fildan |
| 4,713,865 A | 12/1987 | Geldwerth |
| 4,747,622 A | 5/1988 | Weinhold |
| 4,757,593 A | 7/1988 | Pallini, Jr. et al. |
| 4,779,901 A | 10/1988 | Halling |
| 4,785,858 A | 11/1988 | Valentini et al. |
| 4,786,757 A | 11/1988 | Owensby et al. |
| 4,793,637 A | 12/1988 | Laipply et al. |
| 4,795,197 A | 1/1989 | Kaminski et al. |
| 4,808,117 A | 2/1989 | Gale et al. |
| 4,852,917 A * | 8/1989 | Viall, Jr. .................... 285/371 |
| 4,881,760 A | 11/1989 | Runkles et al. |
| 4,900,070 A | 2/1990 | Runkles et al. |
| 4,928,202 A | 5/1990 | Gale et al. |
| 5,016,920 A | 5/1991 | Anderson |
| 5,160,176 A | 11/1992 | Gale |
| 5,188,398 A | 2/1993 | Parimore, Jr. et al. |
| 5,188,400 A | 2/1993 | Riley et al. |
| 5,215,336 A | 6/1993 | Worthing |
| 5,348,349 A | 9/1994 | Sloane |
| 5,350,200 A | 9/1994 | Peterson et al. |
| 5,586,790 A | 12/1996 | Bynum |
| 5,620,210 A | 4/1997 | Eyster et al. |
| 5,704,656 A * | 1/1998 | Rowe ........................ 285/302 |
| 5,746,454 A | 5/1998 | Webb |
| 5,848,501 A | 12/1998 | Taipale et al. |
| 5,851,035 A | 12/1998 | Marc et al. |
| 5,871,239 A | 2/1999 | Boscaljon et al. |
| 5,975,464 A | 11/1999 | Rutan |
| 5,992,896 A * | 11/1999 | Davey et al. ................. 285/49 |
| 6,050,609 A | 4/2000 | Boscaljon et al. |
| 6,073,973 A | 6/2000 | Boscaljon et al. |

FOREIGN PATENT DOCUMENTS

| | | |
|---|---|---|
| IT | 684533 | 3/1965 |
| JP | 1266390 | 10/1989 |
| WO | WO 95/09317 | 4/1995 |
| WO | WO 97/15778 | 5/1997 |
| WO | WO 98/19095 | 5/1998 |
| WO | WO 99/57476 | 11/1999 |
| WO | WO 99/57477 | 11/1999 |

* cited by examiner

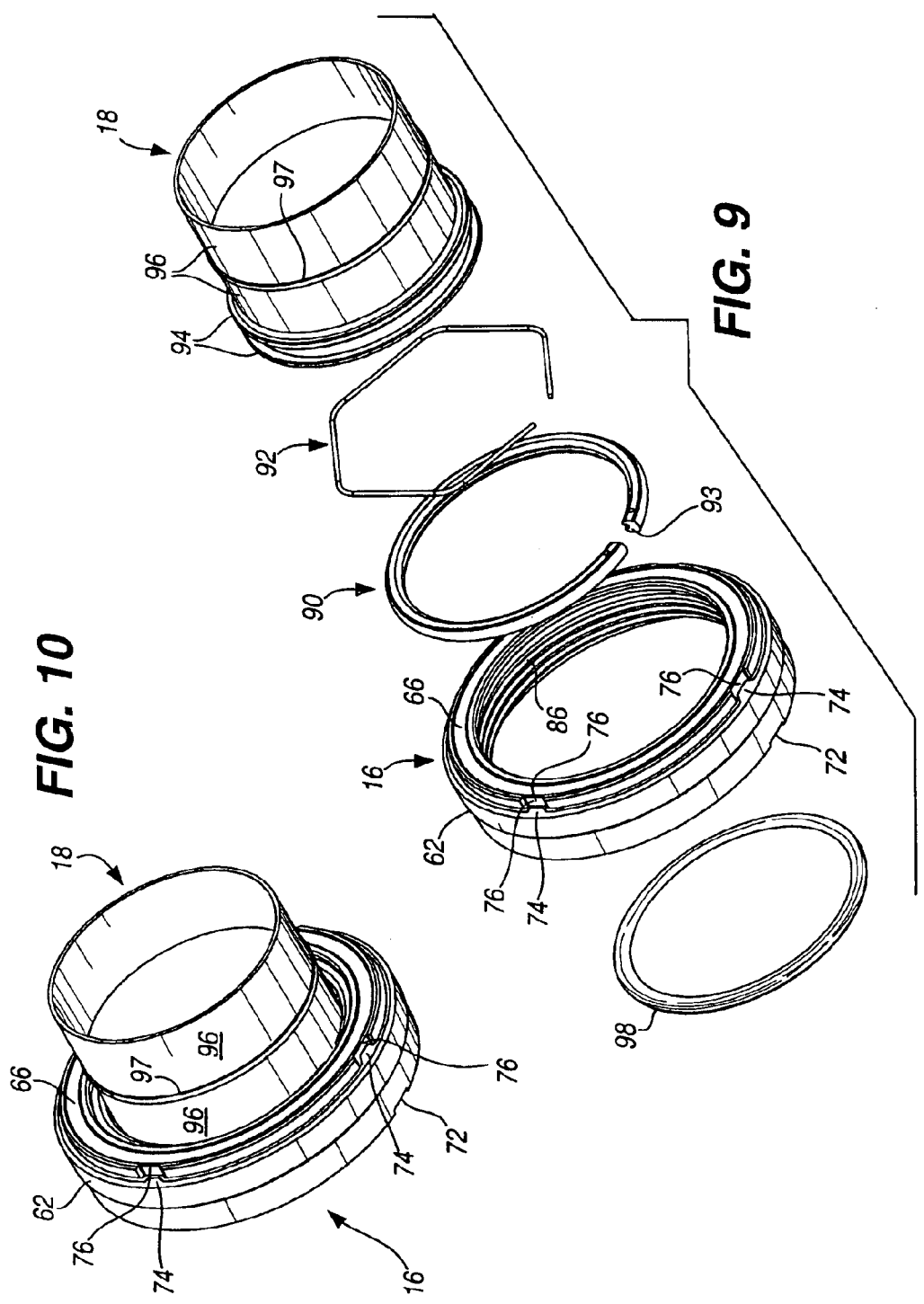

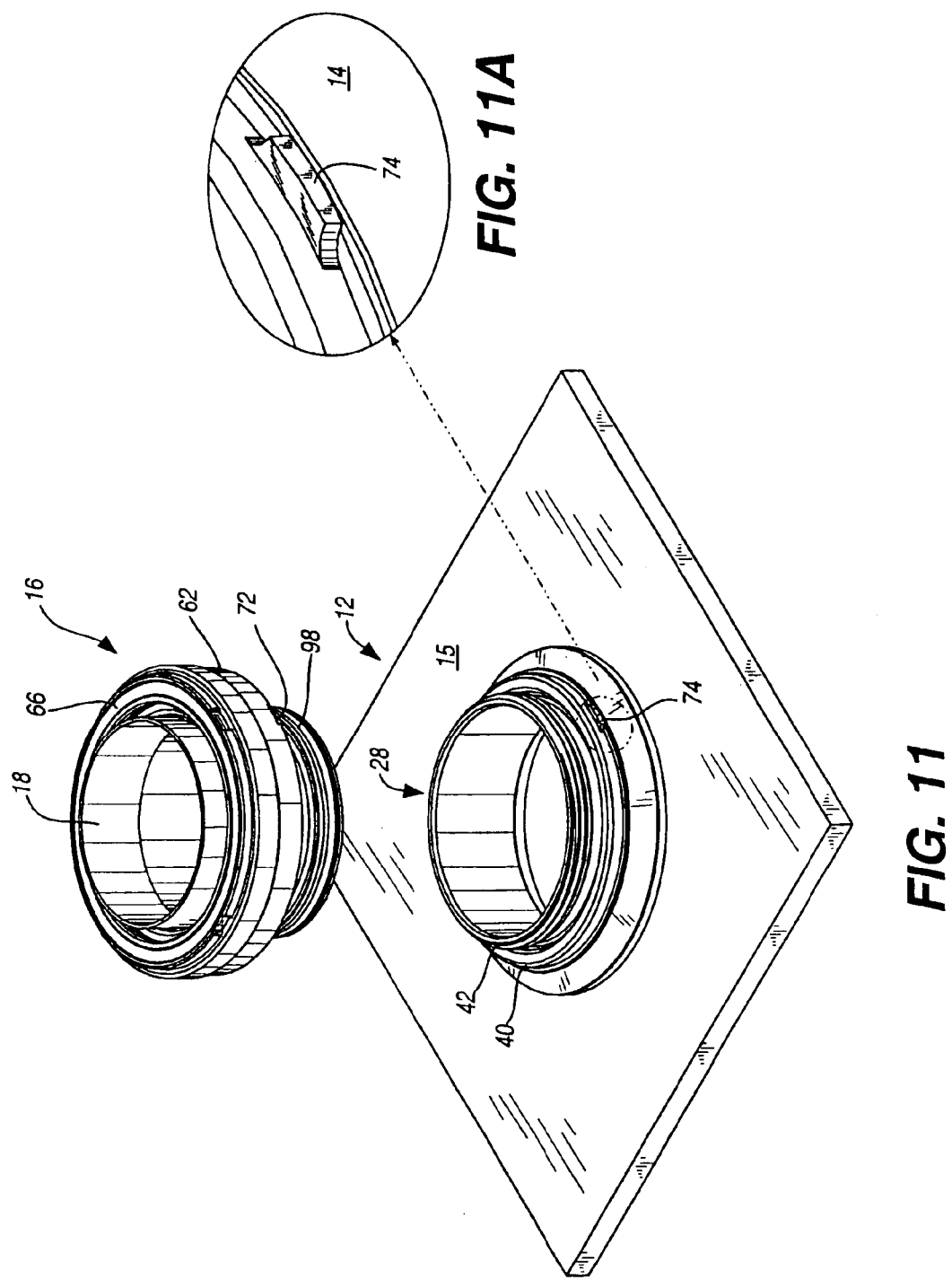

FIG. 12
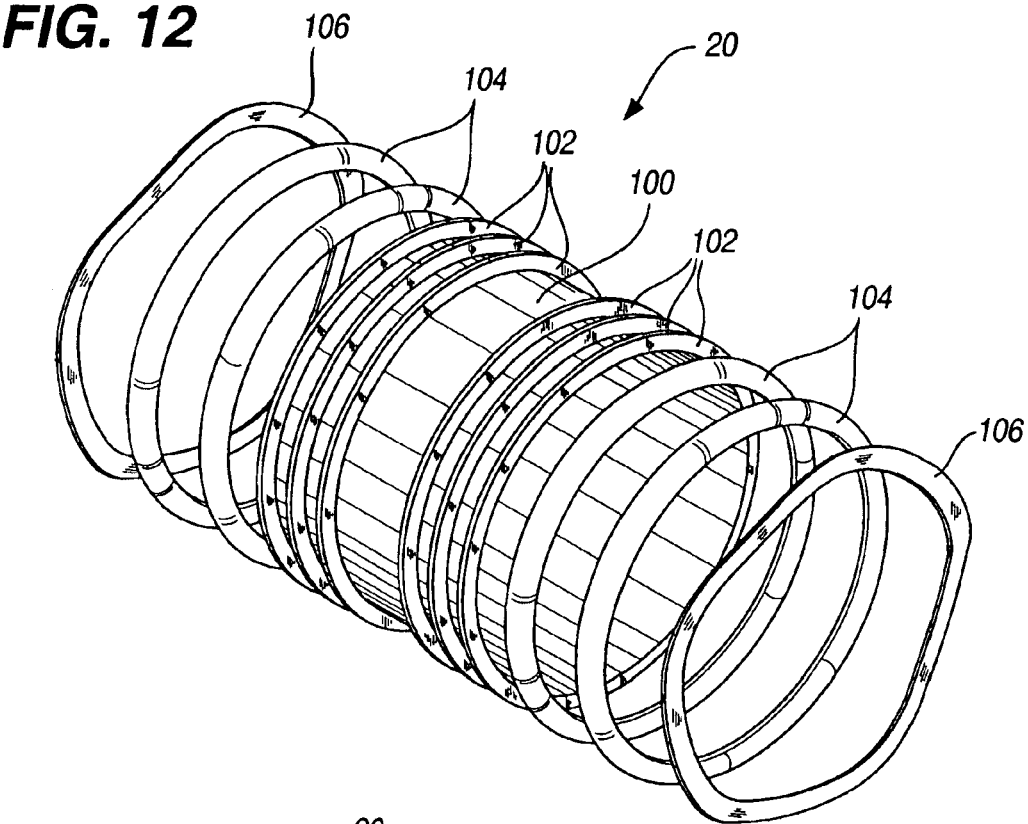
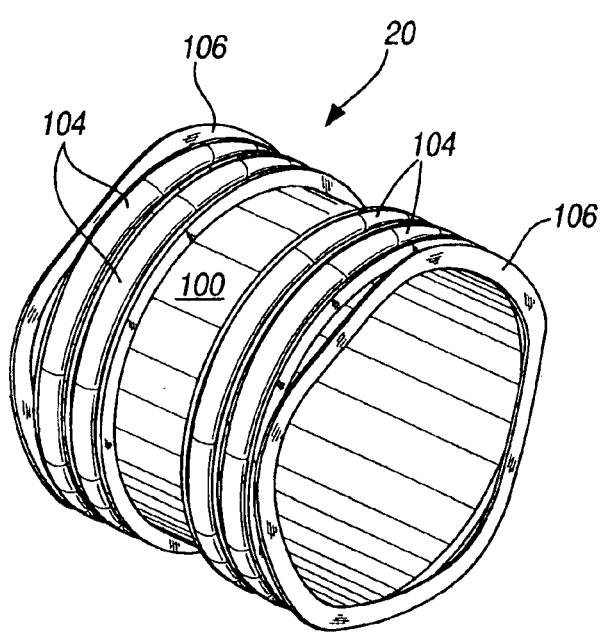
FIG. 13

POSITIVE LOCKING FITTING ASSEMBLY

FIELD OF THE INVENTION

This invention relates to a positive locking fitting assembly for interconnecting two adjacent structures. More particularly, the positive locking fitting assembly relates to a fitting assembly especially adapted for interconnecting modular constructed aircraft to create a leak proof pathway for transfer of fluids between a pair of adjacent modular structures, and further wherein the fitting assembly will not become inadvertently uncoupled due to vibration or other factors experienced through operation of the aircraft.

BACKGROUND OF THE INVENTION

Aircraft fuel and hydraulic systems include a large number of couplings or fittings which interconnect various components within the fuel and hydraulic systems. The couplings must be easy to connect and must provide a locking arrangement to prevent inadvertent uncoupling. It is advantageous to provide couplings or fittings which are of minimum weight, simple in construction, and are also easily serviced for routine maintenance and repair.

The owner of the current invention is also the owner of a number of previous patents for positive lock couplings which are used to interconnect confronting ends of fluid carrying conduits in an aircraft. These patents include the U.S. Pat. Nos. 5,871,239; 6,050,609; and 6,073,973. Each of these patents are hereby incorporated by reference in their entirety. Characteristics common to each of the inventions disclosed in these patents are coupling devices which include a plurality of threaded members which are rotatable in a locking direction, and rotatable in an opposite unlocking direction. Positive locking of the couplings is achieved by positive locking features in the form of locking tabs which are received in corresponding notches/reliefs. A resilient member is provided to ensure that the couplings remain in a locked position when the coupling is tightened to a predetermined extent during rotation in a locking direction. Visual indicia is provided to indicate when the couplings have been placed into locking engagement.

Nadsady U.S. Pat. No. 3,669,472; Gale et al. U.S. Pat. No. 4,808,117 and Gale et al. U.S. Pat. No. 4,928,202 each disclose a coupling device in which the tightening of the coupling parts is readily accomplished, but accidental loosening is restrained by spring fingers carried by one of the coupling parts which engage indentations or notches on the other coupling part in such a manner as to favor relative rotation of the coupling parts in the tightening direction, while restraining with greater force the rotation of the coupling parts in the opposite unlocking direction.

Cannon U.S. Pat. No. 3,999,825; Filippi U.S. Pat. No. 4,008,937; Mahoff U.S. Pat. No. 4,249,786 and Gale U.S. Pat. No. 4,346,428 each disclose a coupling with one or more toggle latches which snap into a positive locking position.

Spinner U.S. Pat. No. 4,285,564 discloses a coaxial plug connector wherein a first ring of axially pointed teeth is provided around the circumference of a cap ring. A first connector has a ring with teeth for engaging the teeth on the cap ring. The cap ring is withdrawn axially against the force of a biasing spring when the coupling is rotated to a different position. The cap ring is released and the spring urges it into locking engagement with the tooth ring. Thus, accidental rotation of the cap ring relative to the first connector is prevented.

Runkles et al. U.S. Pat. No. 4,881,760 discloses a coupling with locking tines having visible indicia for determining whether or not the tines are in locked position.

Runkles et al. U.S. Pat. No. 4,900,070 discloses a coupling with spring biased rotatable locking tines.

Although each of the prior art references may be suitable for their intended purposes, there are a number of additional objectives which are met by the present invention based upon the particular structure in which the fitting assembly is incorporated.

More particularly, the present invention provides a solution for interconnecting two adjacent modular structures. For example, one method that can be used in the construction of an aircraft is the use of separate modular structures which are assembled to form the finished aircraft. Different manufacturing entities may be responsible for producing various modular assemblies or components. Because each of the assemblies or components may be manufactured at remote locations, in order to minimize the efforts required to assemble the components for the finished aircraft, the various components must be designed so that there is minimal construction effort required to mate the components.

One particularly challenging problem arises for interconnection of fluid carrying members between the various modular components of the aircraft. For example, a fuel tank may span between both the fuselage and wing of an aircraft. In such a case, the mating of the modular components, that is, the wing and the fuselage, must be adapted so that a leak proof connection is provided between the modular components. Additionally, because of the various specified manufacturing tolerances of the aircraft components, the fluid connection must also take into account these tolerances so that the connection can remain leak proof despite misaligned modular components.

Another consideration in providing a leak proof connection between the modular components is that the hardware used to span between the modular components must accommodate both parallel match mate and perpendicular or guillotine type match mate assembly methods. A parallel match mate assembly involves two modular components of the aircraft which are joined to one another by movement of the modular components toward one another in a substantially common plane until the abutting ends of the components are aligned. A perpendicular or guillotine type match mate assembly method involves movement of the modular components with respect to one another in a perpendicular or transverse fashion until the abutting ends of the components are aligned.

Yet another consideration in joining a pair of modular components is the need to minimize or eliminate satellite holes placed in the modular component themselves to assist in stabilizing or attaching the hardware for connecting the modular components. In other words, it is desirable to eliminate additional holes or other structural modifications to the modular components which may otherwise alter certain strength characteristics of the modular components, or may introduce vibrational concerns or other structural issues.

Yet another consideration in providing a connection between the modular components is to create redundant sealing at all leak paths, thereby further enhancing the connection's ability to provide a leak proof path during all types of operating conditions.

Yet other considerations include ensuring that the hardware is positively locked to the modular components, and to ensure electrical conductivity through the entire fitting assembly to prevent static buildup across the connection.

With the fitting assembly of the present invention, each of the requirements and considerations set forth above are addressed with a fitting assembly that is structurally simple, can be installed and maintained with minimal effort, and has numerous other advantages as set forth below with respect to the drawings and the description of the invention.

SUMMARY OF THE INVENTION

In accordance with the present invention, a positive locking fitting assembly is provided to interconnect two adjacent structures, such as two modular components of an aircraft in order to provide a leak proof pathway or connection between the modular components. It shall be understood that although the present invention has particular utility with respect to modular constructed aircraft, the invention also has utility with respect to any other type of vehicle or device in which it is necessary to span a gap between two adjacent structures through use of a fitting assembly which provides a leak proof path between the two adjacent structures.

In a preferred embodiment of the present invention, the positive locking fitting assembly includes a pair of couplers which attach to the respective modular components of the aircraft, and a transfer tube that joins the couplers, thereby providing a leak proof path between the modular components. Each of the couplers are also adaptable to receive adjacent tubes or other structures which may lengthen the leak proof path beyond the length of the transfer tube.

In another aspect of the present invention, the positive locking fitting assembly can be described in terms of an improvement to an aircraft wherein the positive locking fitting assembly is incorporated for providing a leak proof path between a pair of modular components which correspond to various sections of the aircraft. Therefore, the present invention can also be defined as a combination of the fitting assembly and modular components of the aircraft.

The couplers are each of identical construction and include three primary subcomponents, namely, a jam nut, a lock nut group, and a modular fitting. Each modular fitting is positioned through a corresponding bore or opening formed in a modular component of the aircraft. Each modular fitting has a first end or portion which resides on one side of its corresponding modular component, and has a second portion or side which resides on the opposite side of the corresponding modular component. The jam nut for each coupler is threaded over a first set of threads on the modular fitting. In order to accommodate the positive locking features of the present invention, opposite thread patterns may be provided for the jam nut and the lock nut group. That is, positive locking of the fitting assembly of the present invention is further enhanced by providing an opposite threading pattern which is further discussed below. As shown in the preferred embodiment, left-handed threads are incorporated for the jam nut. The lock nut group of each coupler is also threadably received over a second set of threads formed on each of the modular fittings. As shown also in the preferred embodiment, the second set of threads on the modular fittings and the lock nut groups incorporate a right-handed thread pattern.

Another aspect of the positive locking features includes the use of a pair of locking tabs on each jam nut, and a corresponding pair of notches/reliefs formed on each lock nut group whereby a predetermined amount of rotation of the lock nut group with respect to the jam nut results in positive engagement of the locking tabs with the corresponding notches/reliefs. Both visual and audio indicators are provided to confirm positive engagement. The visual indicator includes the use of an indicator stripe placed on a shoulder of the jam nut which allows the user to observe whether the lock nut group has been fully installed over the jam nut. The indicator stripe will essentially be hidden once the lock nut group is fully screwed over the jam nut. For the audible indicator engagement of the locking tabs within the corresponding notches/reliefs result in a distinct clicking sound due to the biased arrangement of the lock nut group whereby the nut body and the lock ring of the lock nut group are biased with respect to one another. A biasing member in the form of a wave spring maintains the lock nut group in positive engagement with the jam nut. The lock nut group can be removed by overcoming the force of the biasing member, and rotating the lock nut group in an opposite unlocking direction.

The transfer tube interconnecting the pair of couplers may be installed after both of the modular fittings have been installed with respect to the pair of modular components. The transfer tube is simply inserted through the opening in one of the modular fittings, and is slid across to its position spanning the gap between the pair of modular fittings. The transfer tube is held in place by a pair of wave springs which are trapped between the ends of the transfer tube and the interior ends of the adjacent tubes. The transfer tube includes a plurality of o-ring seals which ensures a leak proof connection between the modular fittings.

The lock nut group includes a number of subcomponents, to include a split retainer, a lock ring, the wave spring mentioned above, and a nut body. The split retainer is retained within the lock ring by an annular slot or shoulder. The wave spring resides within a specified axial area between the lock ring and nut body. The split retainer captures the wave spring on one edge or side of the wave spring. The other side or edge of the wave spring is captured against an interior shoulder of the nut body. Additionally, a plurality of keys or projections are formed on the interior surface of the lock ring which are placed in mating engagement with a corresponding plurality of notches/reliefs formed on the outer surface of the nut body. When the lock nut group is assembled, the lock ring is axially or longitudinally displaceable with respect to the nut body to the extent that the wave spring can be compressed and decompressed within a fixed space or gap between the lock ring and nut body. This displacement allows the locking tabs of the lock nut group to positively lock within the notches of the jam nut, and also allows unlocking by moving the lock ring with respect to the nut body resulting in the notches being disengaged from the locking tabs on the jam nut.

The fitting assembly of the present invention also maintains electrical conductivity through the entire fitting assembly to ensure that there is no static buildup across the connection between the modular components. The inherent construction of the fitting assembly ensures this electrical conductivity by the use of the plurality of springs and other elements of the fitting assembly which maintain contact with one another when assembled. An additional method to ensure electrical conductivity is to provide the various elements of the fitting assembly with conductive coatings. Conductive coating which may be used to ensure electrical conductivity may include coatings such as electroless nickel or nickel teflon coatings. Selected ones of each of the elements as necessary can be provided with the conductive coating.

The present invention also ensures that a leak proof path is provided between the modular components even when there is some misalignment between the bores of the modular components. This misalignment can be due to a number of factors to include manufacturing tolerances for the modular components of the aircraft as well as simple misalignment of the modular components during the mating of the modular components. For differences in the gap between the modular components, the transfer tube can be shortened or lengthened as necessary to accommodate any particular gap. For transverse or perpendicular misalignment between the modular components, the o-ring seals on the transfer tube are expandable and contractible to account for this type of misalignment, thereby providing a sealed pathway between the modular components. The o-rings on the transfer tube can be chosen to accommodate predicted transverse misalignment between the modular components.

In terms of the type of materials which can be used for the various elements of the fitting assembly of the present invention, a number of materials can be chosen depending on a particular application. Typically, the elements can be made of titanium based alloys, aluminum alloys, or even stainless steel alloys. Of course, the most lightweight and high strength alloys are of particular utility with regard to aircraft applications.

In yet another aspect of the present invention, the positive locking fitting assembly can be described in terms of a useful sub-combination wherein there is only a need for one coupler to provide a connection across a single walled component. In such a case, there would only be a need for a single set of sealing members to seal the transfer tube to the single coupler. Accordingly, the transfer tube might include a pair of o-rings which are positioned across the center area of the transfer tube as opposed to on the ends of the transfer tube.

Also in accordance with the present invention, a method is provided for interconnecting a pair of modular components, such as those incorporated within an aircraft. The method includes providing a pair of couplers, placing a transfer tube between the pair of couplers, and then ensuring a positive locking arrangement between the pair of couplers and the corresponding pair of modular components. Preferably within the method, the couplers each include a pair of modular fittings which are first installed through bores or openings in the pair of modular components. One of the couplers may then be fully assembled with respect to a corresponding modular component. The transfer tube may then be inserted through the opening in the modular fitting corresponding to the other coupler not yet assembled. The transfer tube is centered to span the gap between the pair of abutting modular fittings. Finally, the other coupler may be assembled thereby completing the sealed pathway or interconnection between the pair of modular components. Additional advantages and features of this invention will become apparent from the detailed description which follows, taken in conjunction with the accompanying drawings.

BRIEF DESCRIPTION OF THE DRAWINGS

FIG. 9 is an exploded perspective view that illustrates the assembled lock nut group, along with additional components of the invention to include an adjacent transfer tube, and the other subcomponents which allow a leak proof attachment between the adjacent tube and the lock nut group;

FIG. 10 is a perspective view illustrating an adjacent tube when assembled to its corresponding lock nut group;

FIG. 11 is a perspective view illustrating a lock nut group and a corresponding adjacent tube positioned for attachment to a jam nut;

FIG. 11A is an enlarged area of FIG. 11 further illustrating the locking tab formed on the jam nut;

FIG. 12 is an exploded perspective view illustrating the transfer tube, the pair of seals which are located at each end of the transfer tube, and the pair of wave springs that are placed in contact with each end of the transfer tube;

FIG. 13 is a perspective view that illustrates the O-ring seals installed over their respective annular grooves on the ends of the transfer tube, and the wave springs placed against the ends of the transfer tube;

DETAILED DESCRIPTION

Figure 1:
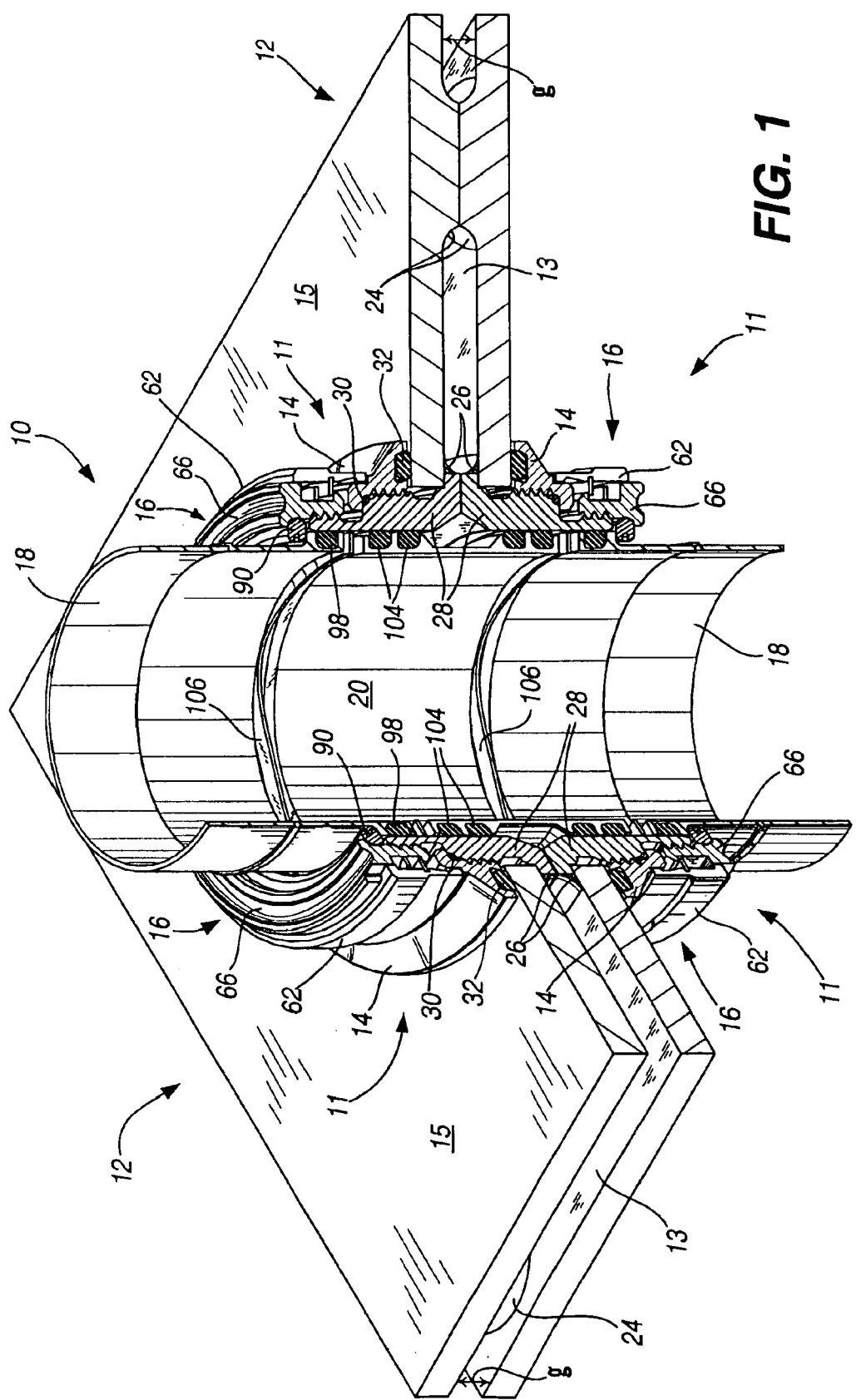
FIG. 1 is a fragmentary perspective view of the positive locking fitting assembly of the present invention illustrating a pair of couplers attached to corresponding perspective modular components, along with a transfer tube interconnecting the couplers as well as a pair of adjacent tubes which extend the leak proof pathway between the modular components.
Figure 2:
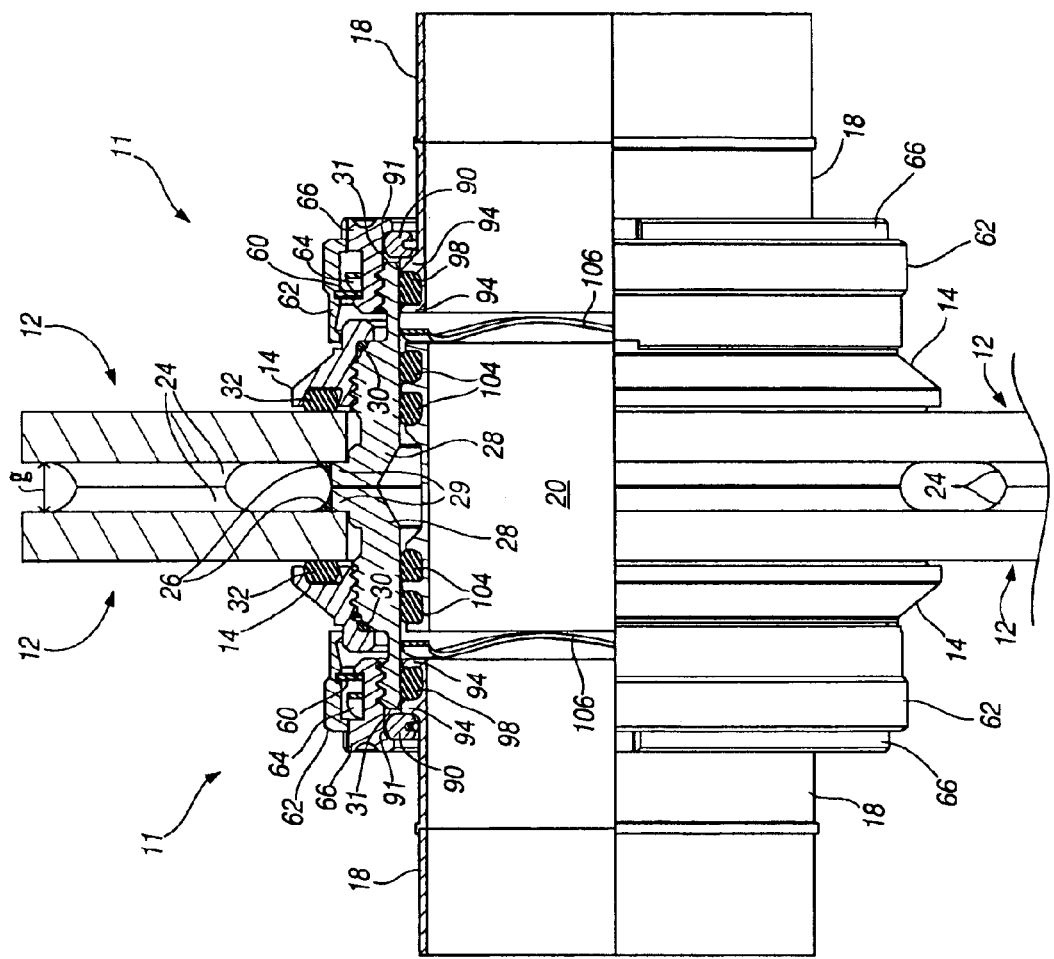
FIG. 2 is a fragmentary partial cross-sectional view of the fitting assembly of FIG. 1 further illustrating details of the present invention.
Figure 3:
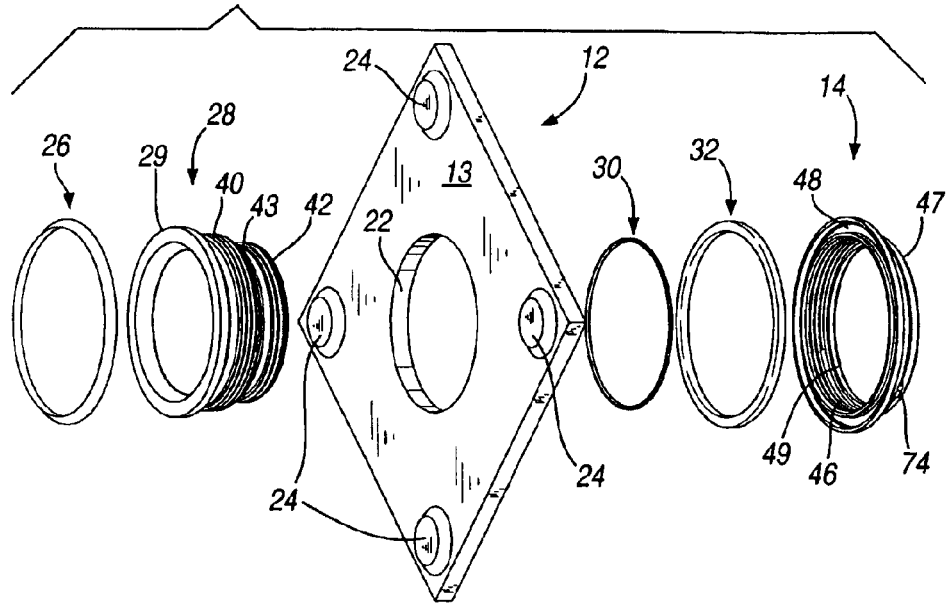
FIG. 3 is an exploded perspective view of some of the components of the coupler located on the right side of the invention according to the view shown in FIGS. 1 and 2, with FIG. 3 specifically illustrating a right side modular fitting, a jam nut, and the various seals associated therewith.

FIGS. 1 and 2 illustrate the fitting assembly 10 of the present invention installed to provide a leak proof connection between adjacent structures, such as two modular components 12 of an aircraft. A transfer tube 20 interconnects two couplers 11 of the fitting assembly 10 wherein each coupler 11 is of identical construction. Thus, it shall be understood that reference to a single coupler or elements of the coupler applies to both couplers because of their identical construction. Referring also to FIG. 3, an opening or bore 22 is formed through each of the modular components 12. A modular fitting 28 is inserted through each bore. The modular fitting 28 includes an interior flange 29 which contacts the inner surface 13 of the modular component 12. Once the modular fitting 28 is in place, a lock nut group 16 is threadably received over a first or base set of threads 40 on the modular fitting 28. An adjacent tube 18 is secured to each lock nut group 16. The adjacent tube 18 provides an extension of desired length for transferring fluid. The transfer tube 20 is positioned to span between the two bores of the modular components 12, and the transfer tube 20 is positioned in a sealing arrangement with respect to the interior surfaces of the pair of abutting modular fittings 28.

A plurality of seals in the form of o-rings are positioned at various locations between the elements to provide a leak proof path through the modular components 12. As further discussed below, the plurality of seals provide a redundant sealing arrangement so that leakage is minimized, if not eliminated.

As shown in the Figures, the respective modular components 12 have a plurality of connection interfaces 24 which create a separation or gap g between the respective interior surfaces 13 of the respective modular components 12. The connection interfaces simply represent those areas where the different sections or components of the aircraft are joined as by welding, threaded connections, or others. The area within the gap g is also referred to herein as the "dry zone" in that the sealed transfer tube 20 does not allow leakage of fluid into the gap g, nor is the dry zone intended by design to retain any fluid. The areas surrounding and adjacent to, as well as the area through the transfer tube and adjacent tubes, can be referred to as the "wet zones" because each of these areas may be designed for storing fluid or for transferring fluid. The transfer tube 20 along with the pair of adjacent tubes 18 are, of course, especially adapted for carrying fluid between the different modular components of the aircraft; According to the view of FIG. 2, the transfer tube and the adjacent tubes could simply interconnect a first fuel tank which could be located exteriorly of the left coupler 11 while a second fuel tank could be located exteriorly of the right coupler 11. Accordingly, the transfer tube 20 can be thought of as interconnecting both sections or parts of a single fuel tank which happens to traverse between two different modular components of the aircraft. Alternatively, the transfer tube 20 and adjacent tubes 18 could provide interconnection between a device for producing a pressurized fluid, such as a pump and a special device on the aircraft operated by the pressurized fluid. One of the transfer tubes 18 would communicate directly with the fluid pressurizing device, while the other adjacent tube would connect to the device on the aircraft which is operated by the pressurized fluid. It should also be understood that although the adjacent tubes 18 are shown, if the fitting assembly of the present invention was simply used to interconnect a pair of fuel tanks having abutting walls defined by the modular components 12, then the adjacent tubes could be eliminated.

Figure 4:
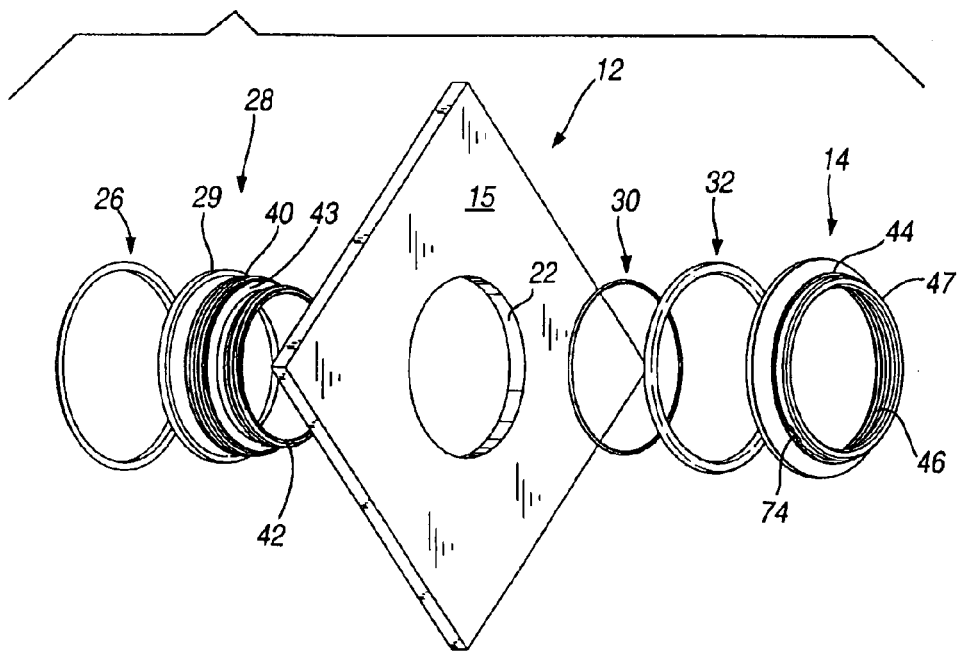
FIG. 4 is another exploded perspective view of the components of the invention shown in FIG. 3, but illustrating the components at a reverse perspective angle.
Figure 5:
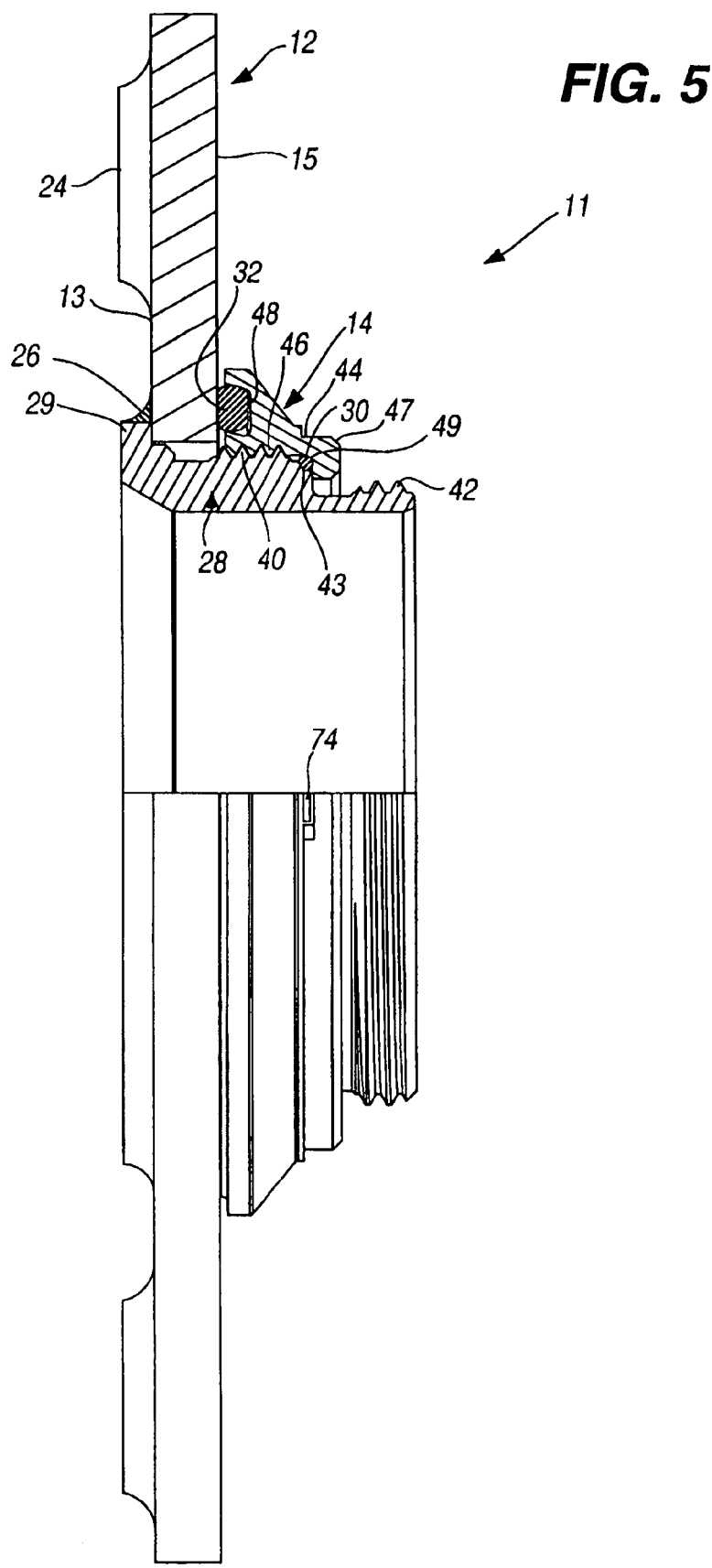
FIG. 5 is an enlarged fragmentary partial vertical cross-section illustrating the right side modular fitting attached to its corresponding modular component as well as the jam nut engaged over the modular fitting.

Referring now to FIGS. 3, 4 and 5, the right side coupler 11 is illustrated with respect to a modular fitting 28 and a jam nut 14 which is threadably received over the modular fitting. The modular fitting 28 is inserted through the bore 22 so that the interior flange 29 rests against the interior edge 13 of the modular component 12. The modular fitting 28 extends through the bore 22 with a first group of threads 40 which mate with the threads 46 of the jam nut 14. A second set of threads 42 on the modular fitting 28 are spaced from the first set of threads 40 and are threadably engaged with threads on the nut body 66 as further discussed below. Referring back to FIGS. 1 and 2, it can be seen how the modular fitting 28 is sealed with respect to the modular component 12, as well as how the jam nut 14 is sealed with respect to the modular component 12. Jam nut 14 includes the internal set of threads 46, an annular slot or groove 48 which receives tolerance damper 32, and a flanged extension 47. Positioned at or near the base of the flanged extension 47 is a tab or projection 74 which is one of the elements used to obtain the positive locking arrangement with the lock nut group 16 as also further discussed below. When assembled, the jam nut 14 is threaded over the first set of threads 40. When tightened a predetermined tightening rotation, the tolerance damper 32, which is simply in the form of an o-ring, is compressed to the desired state against the exterior surface 15 of the modular component 12. Another o-ring 30 is positioned to create a seal between intermediate shoulder 43 on the modular fitting 28 and complementary interior shoulder 49 on the jam nut 14. An interior seal 26 in the form of a bead or extrusion, such as silicon, is used to seal the flange 29 against the interior surface 13. This type of seal is also known in the art as a "fill-it seal".

FIG. 4 illustrates the arrangement of FIG. 3 but at a reverse perspective angle to better view the various details of the elements.

FIG. 5 is simply an enlarged partial cross-section illustrating a jam nut 14 threadably received over a modular fitting 28.

Figure 6:
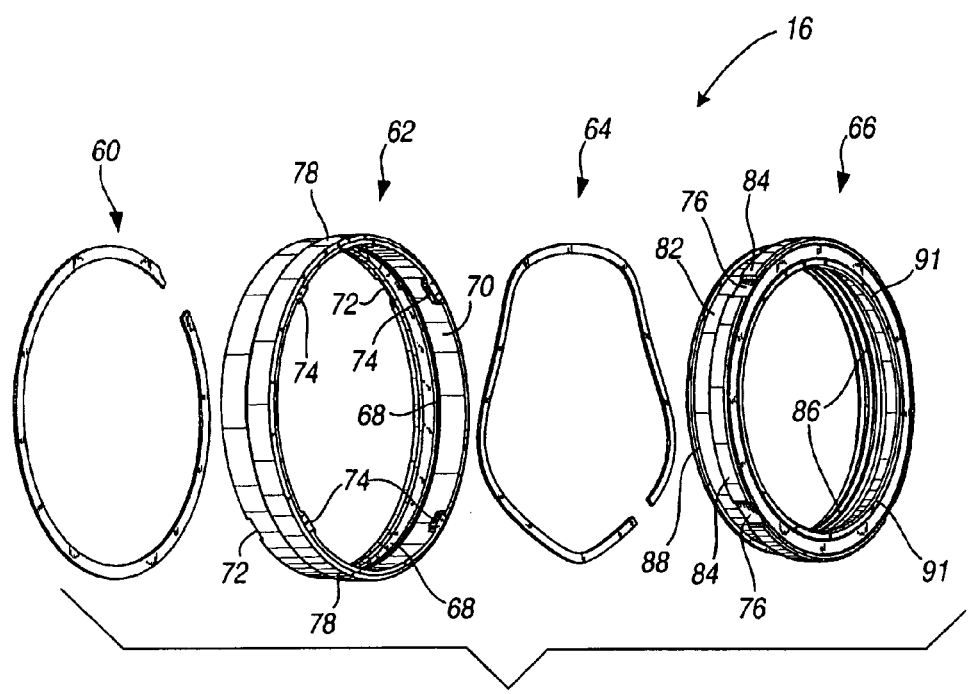
FIG. 6 is an exploded perspective view of the various components of a right side lock nut group including a split retainer, a lock ring, a bonding spring, and a nut body.
Figure 7:
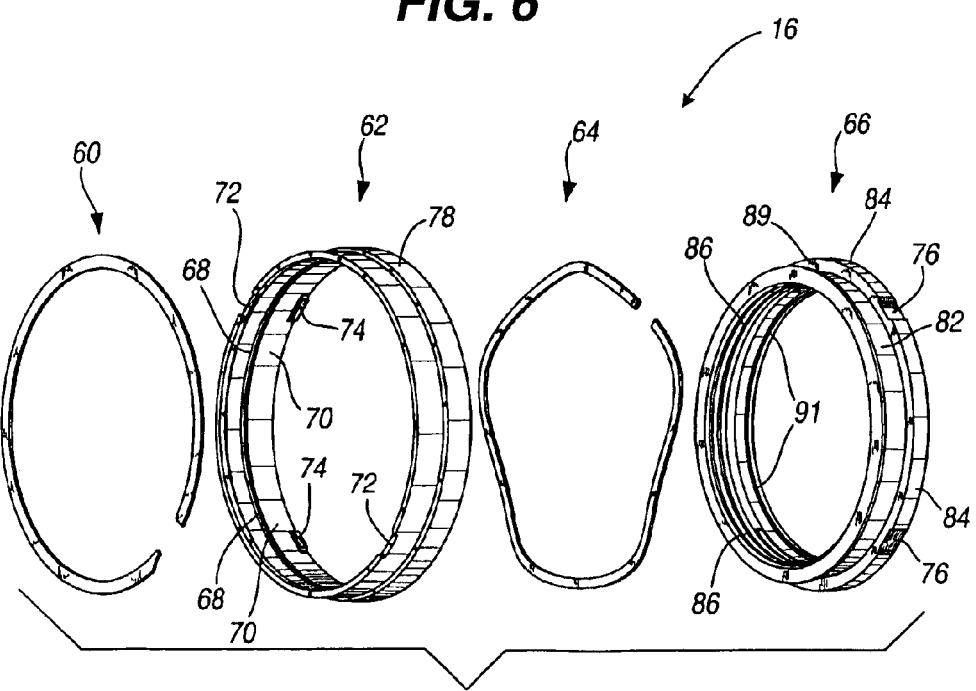
FIG. 7 is another perspective view of components of the lock nut group, but taken at a reverse perspective angle.
Figure 8:
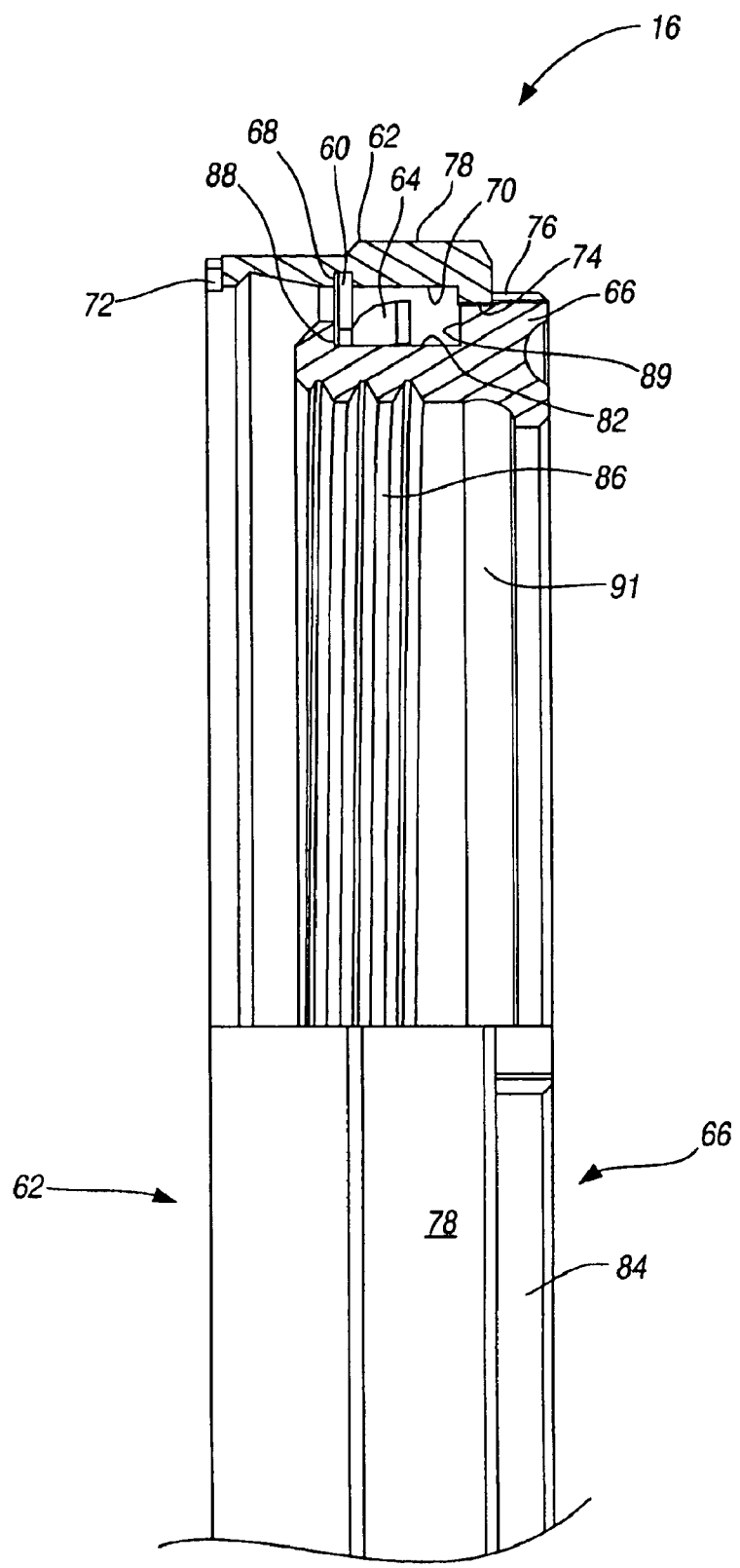
FIG. 8 is an enlarged fragmentary partial vertical cross-section illustrating the lock nut group when assembled.

Now referring to FIGS. 6, 7 and 8, the lock nut group 16 and its various components are illustrated. A lock ring 62 is attached to a nut body 66 as by a split retainer 60 which is received in an annular slot 68 within the lock ring 62. When the lock nut group is assembled, the retainer 60 contacts first exterior shoulder 88 of the nut body 66 so to prevent separation of the nut body 66 and lock ring 62. Referring to FIG. 8, the arrangement of the annular slot 68, the first exterior shoulder 88, and the split retainer 60 are best shown. The interior of the lock ring 62 also includes an interior surface 70 defining a gap which receives the wave spring 64. The wave spring 64 is a wavy-shaped spring member which provides a biased arrangement between the lock ring 62 and the nut body 66. According to the view in FIG. 8 for the right lock nut group 16, pulling or forcing the lock ring 62 to the right would compress the spring 64; therefore, the right lock ring 62 would normally be urged to the left. Similarly, the left lock ring 62 (see FIG. 2) would be normally biased to the right, and the spring would be compressed by pulling the left lock ring 62 to the left. The outer rim 78 of the lock ring 62 may have a knurled surface to improve gripping thereof. A pair of notches 72 or reliefs are formed on the outer rim 78 at approximately 180° from one another. These notches 72 form the second component of this positive locking feature of the present invention.

The lock ring 62 further includes a plurality of keys or projections 74 which extend radially inward. These keys 74 are spaced to match keyways or slots 76 formed on the outer rim 84 of the nut body 66. This key/keyway arrangement ensures that rotation or force imparted upon the lock ring 62 is transferred to the nut body 66. The nut body 66 further includes an annular extension 82 which is positioned in concentric arrangement with respect to the surface 70, thereby also defining the space in which the spring 64 resides.

To assemble the lock nut group 16, the wave spring 64 is first placed in the space defined by surface 70. The nut body 66 is aligned with the lock ring 62, and the nut body 66 is slid into engagement so that the nut body 66 is placed within the lock ring 62 thereby positioning the spring 64 between surface 70 and annular extension 82. Keys 74 reside in slots 76. The split retainer 60 is emplaced by joining the free ends of the split retainer 60 thereby reducing the circumference small enough so that the split retainer may be placed within the annular slot 68. The ends of the split retainer are released and the split retainer 60 is firmly seated within the annular slot 68. The wave spring 64 is trapped between the nut body and the lock ring to bias the two elements with respect to one another. Because of the cross-sectioning shown in FIG. 8 as well as the other cross-sections, the wave spring 64 appears as if it only traverses halfway in the gap created by the spacing between the exposed side of the split retainer 60 and a second interior shoulder 89 of nut body 66; however, as the wave spring 64 traverses the circumference of the nut body 66, it in fact fills the gap at various points thereby providing its spring effect.

Referring to FIGS. 9 and 10, a lock nut group 16 is shown along with a corresponding adjacent tube 18 and the elements which allow the adjacent tube 18 to be secured and sealed with respect to the lock nut group 16. Prior to threading the lock nut group 16 over the second set of threads 42 on the modular fitting 28, a retainer 90 is installed within the annular groove or slot 91 (see FIGS. 6 and 7) formed on the interior surface of the nut body 66. As with the split retainer 60, the free ends of the retainer 90 are closed towards one another, thereby decreasing the circumference of the retainer 90 and allowing it to be slipped into the slot 91. In order to maintain electrical continuity, a bonding jumper wire 92 is placed within an annular groove 93 formed on the inner surface of the retainer 90. This bonding jumper wire 92 ensures conductivity between the exterior surface of the adjacent tube 18 and the retainer 90. As shown in FIG. 2, when the retainer 90 is installed, the retainer 90 is trapped between the outermost flange 94 on the adjacent tube 18 and the slot or groove 91 formed on the interior surface of the nut body 66.

In terms of the construction of the adjacent tube 18, it includes a tube body with one or more tube extensions 96 which may be joined by an appropriate weld 97. The flanges 94 define an annular recess for receiving the o-ring 98. Again referring to FIG. 2, it is seen that the o-ring 98 is placed in a compressed state against the smooth interior surface of the modular fitting 28.

FIG. 11 illustrates the lock nut group 16 and adjacent tube 18 prior to attachment with the modular fitting 28. As shown, the notch/relief 72 formed on the lock ring 62 is arranged for engagement with the key/projection 74 on the jam nut 14. The threads 42 on fitting 28 and the threads 86 on nut body 66 are clocked so that a desired number of rotations of the lock nut group allows the notches 72 to snap fit in engagement with the keys 74. Because of the biasing between the lock ring 62 and nut body 66, as the lock nut group is screwed over the threads 42, there will be a distinct clicking sound once the notches 72 align with and engage the keys 74. This audible indication allows a user to know that the lock nut group has now been placed in a positive locking relationship, thereby placing the fitting assembly for operation. In addition to this audible sound, an indicator stripe in the form of a fluorescent colored annular marking may be placed around the jam nut thereby allowing an operator to observe the rotation of the lock nut group about the jam nut and modular fitting. When the indicator stripe disappears, this would also indicate that the lock nut group is properly positioned to lock the fitting assembly for operation. The indicator stripe could be placed circumferentially around the intermediate portion of the jam nut shown as the circumferential area defined by intermediate shoulder 44 (see FIGS. 4 and 5). In order to release the lock nut group, the user simply pulls back on the lock ring 62 so that the notches 72 are removed from the respective keys 74, then the user may rotate the lock ring 62 in an unlocking direction thereby unthreading the lock nut group 16 with respect to the threads 42.

FIGS. 12 and 13 illustrate the details of the transfer tube 20. As shown, the transfer tube 20 includes a transfer tube body 100, and three annular flanges 102 at both ends of the tube body which define pairs of recesses at both ends of the transfer tube to receive a corresponding pair of transfer tube o-rings 104. The o-rings 104 provide redundant sealing at both ends of the transfer tube as shown in FIG. 2. In order to maintain electrical conductivity through the fitting assembly to include through the transfer tube and through both of the adjacent tubes 18, a pair of wave springs 106 are provided which span any gap between the ends of the transfer tube and the abutting ends of the adjacent tubes 18. The transfer tube 20 can be lengthened or shortened depending upon a particular gap g which must be spanned between the modular components 12.

Figure 14:
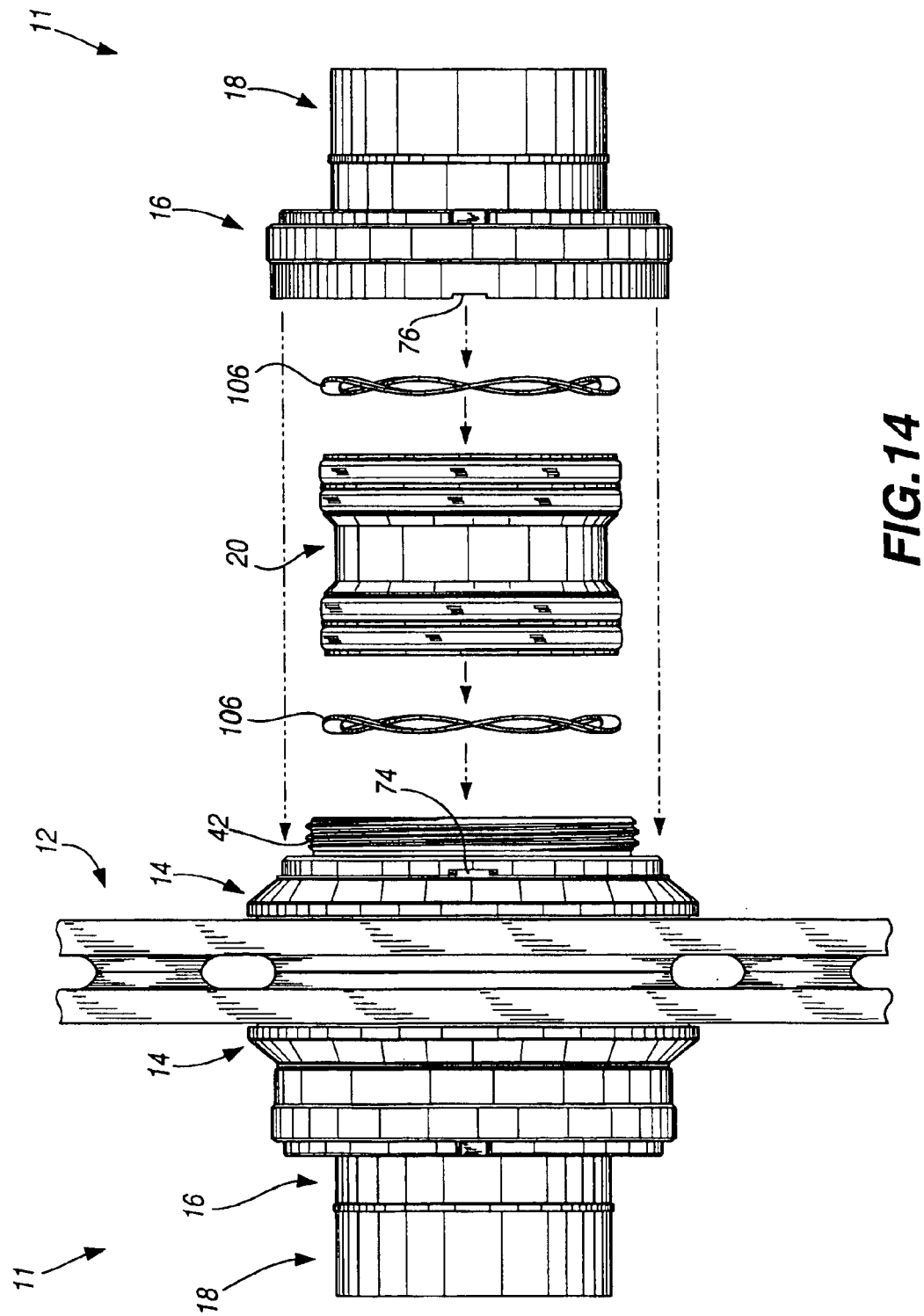
FIG. 14 is an elevation view illustrating the left coupler as assembled, and the right coupler in exploded fashion with respect to the transfer tube, wave springs, lock nut and adjacent tube.

The emplacement of the transfer tube 20 according to the present invention is quite simple. Once one coupler of the fitting assembly has been assembled, such as the left side coupler shown in FIG. 14, the right side coupler may be disassembled by disengaging the right lock nut group 16. Then, the transfer tube along with the pair of wave springs are inserted through the opening in the right jam nut and right modular fitting 28. The transfer tube is centered to span the gap g. The right lock nut group is then reengaged and locked. In order to service or maintain the fitting assembly, both the left and right side coupler can be disassembled, and the transfer tube may be removed as well. Of course, any of the seals or other elements within the fitting assembly may be replaced as necessary.

Figure 15:
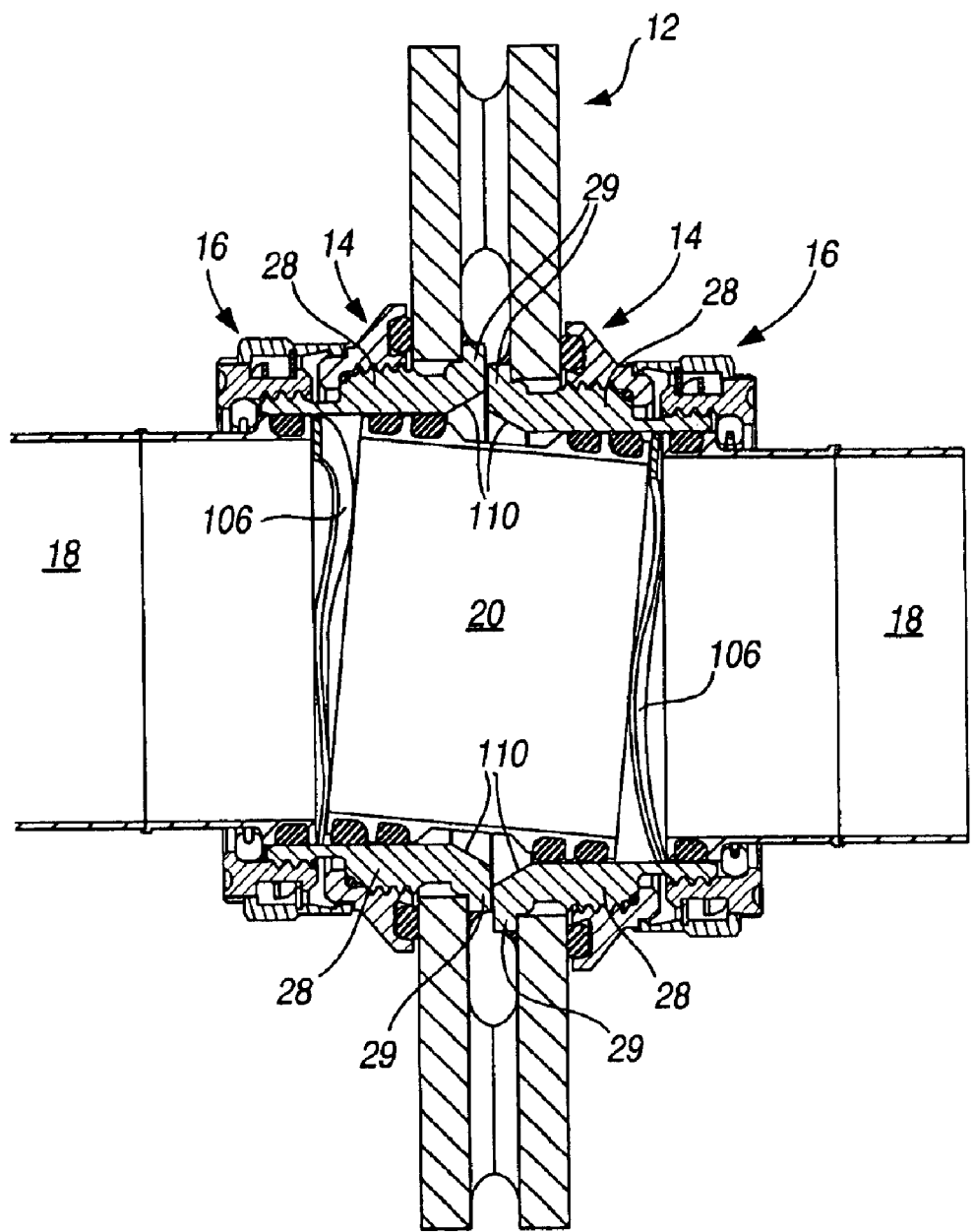
FIG. 15 is a cross-sectional view illustrating how the transfer tube with the present invention accommodates certain imperfections in terms of manufacturing tolerances in the connection of the modular components, yet still ensuring a leak proof path between the modular components.

Referring to FIG. 15, the fitting assembly of the present invention is shown in a circumstance in which there is some misalignment between the bores 22 in the pair of modular components 12. This misalignment could be due to the manufacturing tolerances set forth with a particular aircraft, or the misalignment could occur due to other factors in the assembly of the aircraft. As shown in FIG. 15, the fitting assembly of the present invention is able to provide a leak proof path between the modular components despite modular misalignment. As shown, this is achieved by the ability of the o-ring seals 104 on the transfer tube to expand or contract thereby ensuring that redundant sealing still occurs with respect to the interior surfaces of the modular fittings 28. Depending upon the expected manufacturing tolerances or assembly misalignments, the size and type of the o-rings 104 may be chosen to ensure that worst case scenarios are handled in terms of providing redundant sealing through the transfer tube. As mentioned briefly above, the other type of alignment error which could occur in the assembly of the aircraft is an increased or decreased gap g between the modular components 12. The fitting assembly of the present invention is also able to handle these misalignments by simply adjusting the length of the transfer tube as necessary to ensure that redundant sealing occurs.

As also shown on FIG. 15, the module fittings 28 are designed to accommodate removal of the transfer tubes. Flanges 29 each have sloping surfaces 110 which create an open area allowing the transfer tube to be more easily removed particularly if there is some misalignment between the modular components. As the transfer tube is pulled through the interior cavity between the adjacent tubes, this additional area provided by sloping surfaces 110 allows the trailing edge of the transfer tube to be manipulated as necessary for removal of the transfer tube. Accordingly, minimum effort is required to remove the transfer tube even if there is some appreciable misalignment between the modular components.

Another feature associated with the present invention which ensures that the fitting assembly remains locked is the thread arrangement on the jam nut versus the thread arrangement on the lock nut. When the fitting assembly is installed, the lock nut group as well as the jam nut are locked onto one larger component, namely, the modular component of the aircraft which has attached thereto the modular fitting. Based upon the inherent characteristics of the tolerance damper, it is extremely unlikely that even under the most adverse operating conditions that a modular fitting, jam nut and lock nut group of a coupler would rotate as a single unit; rather, the more likely scenario is that the jam nut will loosen up due to vibrational loads combined with the spring force of the compressed tolerance damper o-ring. As the jam nut loosens, there would be a rotation in a clockwise manner (the jam nut being a left handed threaded arrangement). Referring back to FIG. 2, the gap between the interior edge of retainer 90 and the leading edge 31 of the module fitting 28 closes. As the rotational displacement of the jam nut increases, the gap will close causing interference between the retainer and the flange, thus eliminating further rotation of not only the jam nut, but also the entire coupler. In other words, when the jam nut loosens, it will actually draw the lock nut group towards the jam nut thereby closing the gap between the leading edge 31 and the interior edge of retainer 90.

By the design of the fitting assembly of the present invention, it can also be seen that any path through the various elements of the fitting assembly from any wet zone to the dry zone requires passage through at least two seals. Assuming fluid was stored within the space adjacent to and bounded by surfaces 15 of the modular components 12, any fluid which would leak through this wet zone to the dry zone located between the modular components would have to pass through at least two seals. For example, any leak path around the ends of the modular components would require the fluid to pass through not only tolerance dampers 32, but also through the seals 26. Therefore, there are two seals in that potential leak path. Another example would be fluid which would potentially travel around the jam nut 14, through the threaded connection between the modular fitting 28 and the jam nut 14, around the edge of the modular component 12 and into the dry zone. For this potential leak path, the fluid would have to overcome o-rings 30 as well as seals 26. For any leak path through the fitting assembly from a wet zone to another wet zone, there is at least one sealing member. For example, if a first wet zone was located adjacent the outer surface 15 of one of the modular components, and another wet zone was located through the transfer tube 20 and adjacent tubes 18, there would be a minimum of one sealing member which would prevent leakage between the wet zones. The first wet zone might retain fuel, while the second wet zone through the transfer tube may be transferring other fluids such as hydraulic fluid. In such a case, it would be damaging to have any leaking hydraulic fluid or fuel.

The advantages of the present invention as discussed above are quite apparent. The fitting assembly of the present invention provides a structurally simple yet reliable assembly for interconnecting two adjacent modular components and further provides redundant sealing at all potential leak paths to prevent undesirable migration of fluid around or through the fitting assembly.

The fitting assembly of the present invention is easily maintained because it may be disassembled down to each and every element of the fitting assembly. The manner in which the fitting assembly is installed accommodates both parallel and guillotine/perpendicular type mating methods for the modular components of the aircraft. The positive locking feature of the invention as well as the left handed and right handed threading arrangements ensures that the positive locking fitting assembly cannot become inadvertently uncoupled during operation.

Because of the use of the transfer tube which has multiple dynamic o-ring seals, the fitting assembly may accommodate manufacturing tolerances as well as other misalignments which may occur in assembly of the modular components. Not only is transverse misalignment addressed by the present invention, but also any differential gap between the modular components is also addressed by simply adjusting the length of the transfer tube as necessary.

There is reliable electrical continuity between each of the elements in the fitting assembly which will prevent undesirable static build up at any one or group of elements.

Because the modular components themselves have no satellite holes or other modifications, there are no additional design considerations which must be considered in installing the fitting assembly.

The present invention has been described with respect to a preferred embodiment; however, other changes and modifications can be made within the spirit and scope of the invention.

We claim:

1. A positive locking fitting assembly for interconnecting a pair of modular components, said assembly comprising:
   (a) a pair of couplers spaced from one another and each coupler connected to a corresponding modular component, each coupler comprising:
      (i) a modular fitting attached to the corresponding modular component, said modular fitting having a first end residing adjacent an inner surface of the modular component, and a second threaded end residing adjacent an outer surface of the corresponding modular component;
      (ii) a jam nut threadably received over said second threaded end of said modular fitting, said jam nut having a first locking means disposed thereon;
      (iii) a lock nut positioned adjacent said jam nut, said lock nut having a second complementary locking means that contacts said first locking means to place said lock nut in a locked position, said lock nut being biased to facilitate locking of said second complementary locking means with said first locking means, and said second complementary locking means not contacting said first locking means when said lock nut is in an unlocked position;
   (b) a transfer tube placed between said pair of couplers and spanning a gap between the modular components; and
   (c) means for sealing said transfer tube against said pair of couplers.

2. An assembly, as claimed in claim 1, further comprising:
   a pair of adjacent tubes connected to said pair of couplers wherein one adjacent tube extends beyond one end of said transfer tube, and the other tube of said pair of adjacent tubes extends beyond an opposite end of said transfer tube.

3. A method of interconnecting a pair of structures spaced from one another by a gap, said method comprising the steps of:
   connecting a pair of modular fittings to said pair of structures, said modular fittings when connected, having respective first ends placed adjacent one another, and said modular fittings having respective second ends extending away from one another, each said second end being threaded;

providing a pair of jam nuts and threading one jam nut over a first set of threads of each said second end of said pair of modular fittings;

providing a pair of locking nuts and threading a first locking nut over a second set of threads of one of said modular fittings and rotating the first locking nut until the first locking nut is placed in a positive locking relationship with one of said jam nuts wherein said one jam nut has a first locking means and said first locking nut has a second complementary locking means that contacts said first locking means of said one jam nut;

inserting a transfer tube through the other jam nut of said pair of jam nuts and through the other modular fitting of said pair of modular fittings to span the transfer tube between the respective first ends of the modular fittings; and threading a second locking nut over a second set of threads of the other modular fittings and rotating the second locking nut until the second locking nut is placed in a positive locking relationship with said other jam nut wherein said other jam nut has a first locking means and said second locking nut has a second complementary locking means for releasable contact with said first locking means of said other jam nut.

4. In subcombination, a coupler for providing a sealed connection across an opening of a structure, said subcombination comprising:

a modular fitting attached to the structure at the opening, said modular fitting having a first end residing adjacent one side of the structure, and having a second threaded end residing adjacent an opposite side of the structure;

a jam nut threadably received over the second threaded end of said modular fitting, said jam nut having a first locking means thereon;

a lock nut positioned adjacent said jam nut, said lock nut having a second complementary locking means that contacts said first locking means, said lock nut being biased to lock said second complementary locking means with said first locking means;

a transfer tube placed through said modular fitting and said transfer tube spanning beyond both sides of the structure; and means for sealing said transfer tube against said modular fitting.

5. A positive locking fitting assembly for interconnecting openings formed on a pair of structures separated by a gap, said assembly comprising:

(a) a coupler attached to each structure, each coupler comprising:
  (i) a modular fitting inserted through the opening in the structure, said modular fitting having a first end positioned against an inner surface of the structure, and a second threaded end extending beyond an outer surface of the structure;
  (ii) a jam nut threadably received over said second threaded end of said modular fitting, said jam nut having a first locking means disposed thereon;
  (iii) a lock nut positioned adjacent said jam nut, said lock nut having a second complementary locking means for releasable engagement with said first locking means, said lock nut including a spring to bias said lock nut wherein said spring causes said second complementary locking means to lock with said first locking means when said first and second locking means are engaged;

(b) a transfer tube placed between said pair of couplers and spanning the gap between the structures; and (c) means for sealing said transfer tube against said pair of couplers thereby providing a leakproof path between the openings of the structures.

6. An assembly, as claimed in claim 5, wherein:

said modular fitting further includes a flange formed at said first end thereof which contacts the inner surface of said structure, and a seal positioned around a periphery of said flange thereby providing a fluid tight seal at said first end of said modular fitting with respect to said inner surface of the structure.

7. An assembly as claimed in claim 5, wherein:

said second end of said modular fitting includes a first set of threads having a first diameter for receiving said jam nut thereon, and further includes a second set of threads having a smaller second diameter and spaced from said first set of threads for receiving said lock nut thereon.

8. An assembly, as claimed in claim 5, wherein:

said jam nut includes an annular slot formed thereon to receive a tolerance damper seal therein, said tolerance damper being placed against the outer surface of said structure thereby providing a fluid tight seal between the outer surface and said jam nut.

9. An assembly, as claimed in claim 7, wherein:

said coupler further includes a primary seal mounted over said modular fitting between said first and second set of threads, wherein said primary seal contacts said lock nut when said lock nut is attached to said jam nut, said primary seal thereby providing a fluid tight seal between an outer surface of the jam nut and an inner surface of the lock nut.

10. An assembly, as claimed in claim 5, wherein:

said lock nut further includes a lock ring having a plurality of spaced projections formed on an inner surface thereof and extending radially inward, and said lock nut further including a nut body having a plurality of spaced slots formed on an outer peripheral surface thereof wherein said lock ring is received over said nut body and said spaced projections are aligned with and received in said spaced slots thereby preventing rotation of the nut body within the lock ring.

11. An assembly, as claimed in claim 10, wherein:

said second complementary locking means is formed on said lock ring on a transverse face thereof, said second complementary locking means including a plurality of spaced notches.

12. An assembly, as claimed in claim 10, wherein:

said first locking means includes a plurality of spaced projections formed on an outer surface of said jam nut.

13. An assembly, as claimed in claim 5, wherein:

said first complementary locking means includes a plurality of spaced projections formed on an outer surface of said jam nut, and said second complementary locking means includes a plurality of spaced notches formed on said lock ring wherein said plurality of spaced projections are received in said plurality of spaced notches when said coupler is placed in a locked position.

14. An assembly, as claimed in claim 5, wherein said lock nut further includes:

a lock ring;

a nut body received in said lock ring;

a bonding spring inserted within said lock ring and abutting said nut body; and a split retainer attached between said lock ring and said nut body, and securing said bonding spring in a space defined between said lock ring and said nut body wherein said bonding spring provides an axial biasing force, said lock ring being axially translatable with respect to said nut body within a predetermined range of axial displacement.

15. An assembly, as claimed in claim 5, further including:

an adjacent tube connected to said modular fitting, said adjacent tube including a tube body, an o-ring secured to an end of said adjacent tube and sealed within said second end of said modular fitting; and a retainer ring circumferentially surrounding said adjacent tube and positioned between said adjacent tube and said lock nut thereby preventing axial translation of said adjacent tube with respect to said lock nut.

16. A positive locking fitting assembly for interconnecting openings formed on a pair of structures separated by a gap, said assembly comprising:
  (a) a coupler attached to each structure, each coupler comprising:
    (i) a first coupler part inserted through and secured to the opening in the structure, said first coupler part having a first end attached to an inner surface of the structure, and a second end extending beyond an outer surface of the structure;
    (ii) a second coupler part threadably received over said second end of said first coupler part;
    (iii) means for releasably locking said second part on said first part, said means for releasably locking being activated by a predetermined amount of rotation of said second coupler part with respect to said first coupler part;
  (b) a transfer tube placed between said couplers and spanning the gap between the structures;
  (c) means for sealing said transfer tube against said couplers thereby providing a leak proof path between the openings of the structures; and
  (d) an adjacent tube attached to and sealed with each coupler thereby extending the leak proof path beyond said transfer tube in both directions.

17. A fitting assembly for interconnecting openings formed on a pair of adjacent structures separated by a gap, said assembly comprising:

a fluid conveying conduit;

means attached to each structure at said openings for releasably and sealingly receiving the fluid conveying conduit at both ends of said means for receiving, said fluid conveying conduit including a pair of adjacent tubes which extend away from outer sides of said structures, and said fluid conveying conduit further including a transfer tube which spans said gap, said transfer tube and said adjacent tubes forming a continuous leak proof path extending beyond ends of said transfer tube;

said means for receiving including means for releasably locking integrated with said means for receiving wherein said means for receiving may be assembled and disassembled, disassembly allowing access to said transfer tube and said adjacent tubes; and wherein said means for releasably locking when locked prevents access to remove said transfer tube and said adjacent tubes.

18. An assembly, as claimed in claim 17, wherein:

said means for receiving includes a pair of couplers attached to said pair of adjacent structures, each of said couplers having a first part which is received through one opening formed in one of said adjacent structures and a second part which is threadably received over the first part, said means for releasably locking being incorporated on both said first and second parts.

19. A positive locking fitting assembly for interconnecting a pair of modular components, said assembly comprising:
  (a) a pair of couplers spaced from one another and each coupler connected to a corresponding modular component, each coupler comprising:
    (i) a modular fitting attached to the corresponding modular component, said modular fitting having a first end residing adjacent an inner surface of the modular component, and a second threaded end residing adjacent an outer surface of the corresponding modular component;
    (ii) a jam nut threadably received over said second threaded end of said modular fitting, said jam nut having a first locking means disposed thereon;
    (iii) a lock nut positioned adjacent said jam nut, said lock nut having a second complementary locking means for releasable engagement with said first locking means, said lock nut being biased to lock said second complementary locking means with said first locking means;
  (b) a transfer tube placed between said pair of couplers and spanning a gap between the modular components;
  (c) means for sealing said transfer tube against said pair of couplers; and
  a pair of adjacent tubes connected to said pair of couplers wherein one adjacent tube extends beyond one end of said transfer tube, and the other tube of said pair of adjacent tubes extends beyond an opposite end of said transfer tube.

20. A positive locking fitting assembly for interconnecting openings formed on a pair of structures separated by a gap, said assembly comprising:
  (a) a coupler attached to each structure, each coupler comprising:
    (i) a modular fitting inserted through the opening in the structure, said modular fitting having a first end positioned against an inner surface of the structure, and a second threaded end extending beyond an outer surface of the structure;
    (ii) a jam nut threadably received over said second threaded end of said modular fitting, said jam nut having a first locking means disposed thereon;
    (iii) a lock nut positioned adjacent said jam nut, said lock nut having a second complementary locking means for releasable engagement with said first locking means, said lock nut being biased to lock said second complementary locking means with said first locking means;
  (b) a transfer tube placed between said pair of couplers and spanning the gap between the structures;
  (c) means for sealing said transfer tube against said pair of couplers thereby providing a leakproof path between the openings of the structures; and
  said second end of said modular fitting includes a first set of threads having a first diameter for receiving said jam nut thereon, and further includes a second set of threads having a smaller second diameter and spaced from said first set of threads for receiving said lock nut thereon.

21. A positive locking fitting assembly for interconnecting openings formed on a pair of structures separated by a gap, said assembly comprising:
  (a) a coupler attached to each structure, each coupler comprising:

(i) a modular fitting inserted through the opening in the structure, said modular fitting having a first end positioned against an inner surface of the structure, and a second threaded end extending beyond an outer surface of the structure;

(ii) a jam nut threadably received over said second threaded end of said modular fitting, said jam nut having a first locking means disposed thereon;

(iii) a lock nut positioned adjacent said jam nut, said lock nut having a second complementary locking means for releasable engagement with said first locking means, said lock nut being biased to lock said second complementary locking means with said first locking means;

(b) a transfer tube placed between said pair of couplers and spanning the gap between the structures;

(c) means for sealing said transfer tube against said pair of couplers thereby providing a leakproof path between the openings of the structures; and said jam nut includes an annular slot formed thereon to receive a tolerance damper seal therein, said tolerance damper being placed against the outer surface of said structure thereby providing a fluid tight seal between the outer surface and said jam nut.

22. An assembly, as claimed in claim 20, wherein:

said coupler further includes a primary seal mounted over said modular fitting between said first and second set of threads, wherein said primary seal contacts said lock nut when said lock nut is attached to said jam nut, said primary seal thereby providing a fluid tight seal between an outer surface of the jam nut and an inner surface of the lock nut.

23. A positive locking fitting assembly for interconnecting openings formed on a pair of structures separated by a gap, said assembly comprising:

(a) a coupler attached to each structure, each coupler comprising:

(i) a modular fitting inserted through the opening in the structure, said modular fitting having a first end positioned against an inner surface of the structure, and a second threaded end extending beyond an outer surface of the structure;

(ii) a jam nut threadably received over said second threaded end of said modular fitting, said jam nut having a first locking means disposed thereon;

(iii) a lock nut positioned adjacent said jam nut, said lock nut having a second complementary locking means for releasable engagement with said first locking means, said lock nut being biased to lock said second complementary locking means with said first locking means;

(b) a transfer tube placed between said pair of couplers and spanning the gap between the structures;

(c) means for sealing said transfer tube against said pair of couplers thereby providing a leakproof path between the openings of the structures; and said lock nut further includes a lock ring having a plurality of spaced projections formed on an inner surface thereof and extending radially inward, and said lock nut further including a nut body having a plurality of spaced slots formed on an outer peripheral surface thereof wherein said lock ring is received over said nut body and said spaced projections are aligned with and received in said spaced slots thereby preventing rotation of the nut body within the lock ring.

24. An assembly, as claimed in claim 23, wherein:

said second complementary locking means is formed on said lock ring on a transverse face thereof, said second complementary locking means including a plurality of spaced notches.

25. An assembly, as claimed in claim 23, wherein:

said first locking means includes a plurality of spaced projections formed on an outer surface of said jam nut.

26. A positive locking fitting assembly for interconnecting openings formed on a pair of structures separated by a gap, said assembly comprising:

(a) a coupler attached to each structure, each coupler comprising:

(i) a modular fitting inserted through the opening in the structure, said modular fitting having a first end positioned against an inner surface of the structure, and a second threaded end extending beyond an outer surface of the structure;

(ii) a jam nut threadably received over said second threaded end of said modular fitting, said jam nut having a first locking means disposed thereon;

(iii) a lock nut positioned adjacent said jam nut, said lock nut having a second complementary locking means for releasable engagement with said first locking means, said lock nut being biased to lock said second complementary locking means with said first locking means;

(b) a transfer tube placed between said pair of couplers and spanning the gap between the structures;

(c) means for sealing said transfer tube against said pair of couplers thereby providing a leakproof path between the openings of the structures; and said first complementary locking means includes a plurality of spaced projections formed on an outer surface of said jam nut, and said second complementary locking means includes a plurality of spaced notches formed on said lock ring wherein said plurality of spaced projections are received in said plurality of spaced notches when said coupler is placed in a locked position.

27. A positive locking fitting assembly for interconnecting openings formed on a pair of structures separated by a gap, said assembly comprising:

(a) a coupler attached to each structure, each coupler comprising:

(i) a modular fitting inserted through the opening in the structure, said modular fitting having a first end positioned against an inner surface of the structure, and a second threaded end extending beyond an outer surface of the structure;

(ii) a jam nut threadably received over said second threaded end of said modular fitting, said jam nut having a first locking means disposed thereon;

(iii) a lock nut positioned adjacent said jam nut, said lock nut having a second complementary locking means for releasable engagement with said first locking means, said lock nut being biased to lock said second complementary locking means with said first locking means, said lock nut further including a lock ring, a nut body received in said lock ring, a bonding spring inserted within said lock ring and abutting said nut body, and a split retainer attached between said lock ring and said nut body, and securing said bonding spring in a space defined between said lock ring and said nut body wherein said bonding spring provides an axial biasing force, said lock ring being axially translatable with respect to said nut body within a predetermined range of axial displacement;

(b) a transfer tube placed between said pair of couplers and spanning the gap between the structures; and (c) means for sealing said transfer tube against said pair of couplers thereby providing a leakproof path between the openings of the structures.

28. A positive locking fitting assembly for interconnecting openings formed on a pair of structures separated by a gap, said assembly comprising:

(a) a coupler attached to each structure, each coupler comprising:
  (i) a modular fitting inserted through the opening in the structure, said modular fitting having a first end positioned against an inner surface of the structure, and a second threaded end extending beyond an outer surface of the structure;
  (ii) a jam nut threadably received over said second threaded end of said modular fitting, said jam nut having a first locking means disposed thereon;
  (iii) a lock nut positioned adjacent said jam nut, said lock nut having a second complementary locking means for releasable engagement with said first
  (ii) a jam nut received over said second end of said modular fitting, said jam nut having a first locking means formed on an outer surface of said jam nut and spaced from said modular fitting;
  (iii) a lock nut positioned adjacent said jam nut and received over said second end of said modular fitting, said lock nut having a second complementary locking means formed on an outer surface thereof that contacts said first locking means;

(b) a transfer tube positioned between said pair of couplers and spanning a gap between the modular components; and (c) means for sealing said transfer tube against said pair of couplers thereby providing a leak proof path through said transfer tube and said pair of couplers.

29. A positive locking fitting assembly for interconnecting a pair of modular components, said assembly comprising:

(a) a pair of couplers spaced from one another and each coupler connected to a corresponding modular component, each coupler comprising:
  (i) a modular fitting attached to the corresponding modular component, said modular fitting having a first end residing adjacent an inner surface of the modular component, and a second threaded end residing adjacent an outer surface of the corresponding modular component; contacts said first locking means, said lock nut including means for biasing said lock nut thereby enabling said lock nut to be locked with respect to said jam nut;

a transfer tube placed through said modular fitting and said transfer tube spanning beyond at least one side of the structure; and means for sealing said transfer tube against said modular fitting.

30. In subcombination, a coupler for providing a sealed connection across an opening of a structure, said subcombination comprising:

a modular fitting attached to the structure at the opening, said modular fitting having a first end residing adjacent one side of the structure, and having a second end residing adjacent an opposite side of the structure;

a jam nut threadably received over the second end of the modular fitting, said jam nut having a first locking means disposed thereon and spaced from said modular fitting;

a lock nut received over said modular fitting and positioned adjacent said jam nut, said lock nut having a second complementary locking means disposed thereon that locking means, said lock nut being biased to lock said second complementary locking means with said first locking means;

(b) a transfer tube placed between said pair of couplers and spanning the gap between the structures;

(c) means for sealing said transfer tube against said pair of couplers thereby providing a leakproof path between the openings of the structures;

(d) an adjacent tube connected to said modular fitting, said adjacent tube including a tube body, an o-ring secured to an end of said adjacent tube and sealed within said second end of said modular fitting; and (e) a retainer ring circumferentially surrounding said adjacent tube and positioned between said adjacent tube and said lock nut thereby preventing axial translation of said adjacent tube with respect to said lock nut.

31. A positive locking fitting assembly for interconnecting openings formed on a pair of structures separated by a gap, said assembly comprising:

(a) a coupler attached to each structure, each coupler comprising:
  (i) a first coupler part secured to a corresponding opening in the structure, said first coupler part having a first end attached to the structure, and a second end extending beyond the structure;
  (ii) a second coupler part received over said second end of said first coupler part;
  (iii) means for releasably locking said second coupler part on said first coupler part, said means for locking including biasing means to bias said first coupler Dart with respect to said second coupler part said means for releasably locking being activated to lock said second coupler part with respect to said first coupler part by rotating said second coupler part a predetermined amount;

(b) a transfer tube placed between said couplers and spanning the gap between the structures; and (c) means for sealing said transfer tube against said couplers thereby providing a leak proof path between the openings of the structures.

* * * * *

UNITED STATES PATENT AND TRADEMARK OFFICE
CERTIFICATE OF CORRECTION

PATENT NO. : 6,883,836 B2
APPLICATION NO. : 10/347096
DATED : April 26, 2005
INVENTOR(S) : Breay et al.

It is certified that error appears in the above-identified patent and that said Letters Patent is hereby corrected as shown below:

Claim 16, column 15
Line 36, delete "leak proof" and insert --leakproof-- therefor;
Line 39, delete "leak proof" and insert --leakproof-- therefor;

Claim 28, column 19
Line 24, after "first" insert --locking means, said lock nut being biased to lock said second complementary locking means with said first locking means;-- therefor;

Lines 25-33, delete all text;

Line 34, delete "positioned" and insert --placed-- therefor;

Line 35, delete "a" and insert --the-- therefor;

Lines 35-36, delete "modular components; and" and insert --structures;-- therefor;

Lines 38-39, delete "leak proof path through said transfer tube and said pair of couplers" and insert --leakproof path between the openings of the structures;
    (d) an adjacent tube connected to said modular fitting, said adjacent tube including a tube body, an o-ring secured to an end of said adjacent tube and sealed within said second end of said modular fitting; and (e) a retainer ring circumferentially surrounding said adjacent tube and positioned between said adjacent tube and said lock nut thereby preventing axial translation of said adjacent tube with respect to said lock nut-- therefor;

Claim 29, column 19
Lines 50-58, delete all text beginning with "contacts" and ending with "fitting" and insert
    -- (ii) a jam nut received over said second end of said modular fitting, said jam nut having a first locking means formed on an outer surface of said jam nut and spaced from said modular fitting;
    (iii) a lock nut positioned adjacent said jam nut and received over said second end of said modular fitting, said lock nut having a second complementary locking means formed on an outer surface thereof that contacts said first locking means;
    (b) a transfer tube positioned between said pair of couplers and spanning a gap between the modular components; and
    (c) means for sealing said transfer tube against said pair of couplers thereby providing a leak proof path through said transfer tube and said pair of couplers-- therefor;

UNITED STATES PATENT AND TRADEMARK OFFICE
CERTIFICATE OF CORRECTION

PATENT NO. : 6,883,836 B2
APPLICATION NO. : 10/347096
DATED : April 26, 2005
INVENTOR(S) : Breay et al.

It is certified that error appears in the above-identified patent and that said Letters Patent is hereby corrected as shown below:

Claim 30, column 20
Line 16, after "that" insert --contacts said first--;
Lines 16-32, delete all text beginning with "being" and ending with "nut" and insert --including means for biasing said lock nut thereby enabling said lock nut to be locked with respect to said jam nut;
 a transfer tube placed through said modular fitting and said transfer tube spanning beyond at least one side of the structure; and
  means for sealing said transfer tube against said modular fitting-- therefor;

Claim 31, column 20
Line 47, delete "Dart" and insert --part-- therefor;

Signed and Sealed this

Twenty-eighth Day of August, 2007

JON W. DUDAS
*Director of the United States Patent and Trademark Office*